C. E. BONINE.
MANIFOLD.
APPLICATION FILED OCT. 1, 1910.
999,147. Patented July 25, 1911.
2 SHEETS—SHEET 2.
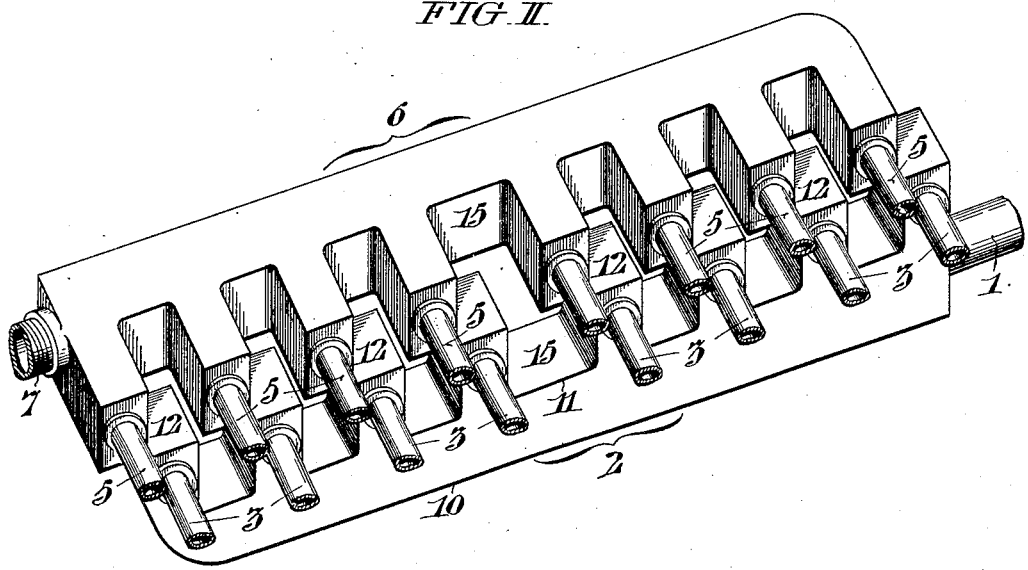
FIG. II.
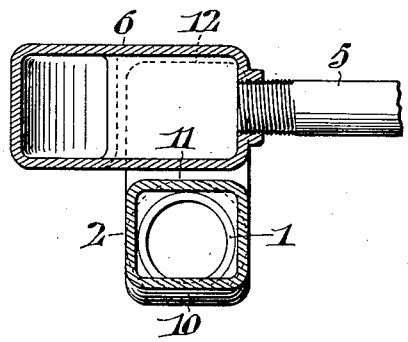
FIG. III.
Witnesses
John C. Bergner
James H. Bell
Inventor
Charles E. Bonine,
by Mucey & Paul
Attorneys

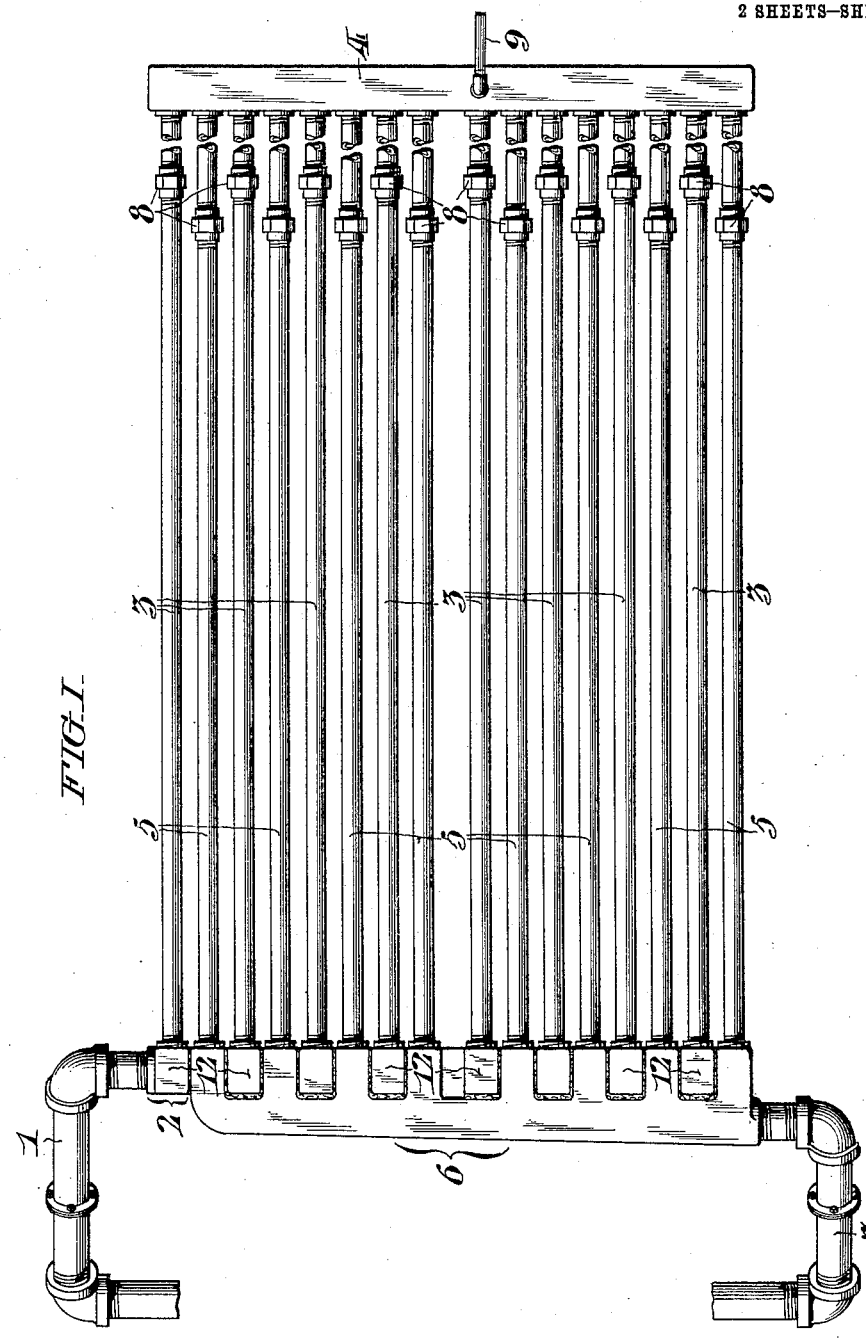

UNITED STATES PATENT OFFICE.

CHARLES E. BONINE, OF PHILADELPHIA, PENNSYLVANIA, ASSIGNOR TO NEWTOWN PRODUCING COMPANY, OF NEWTOWN, PENNSYLVANIA, A CORPORATION OF PENNSYLVANIA.

MANIFOLD.

999,147.            Specification of Letters Patent.      Patented July 25, 1911.

Application filed October 1, 1910. Serial No. 584,812.

*To all whom it may concern:*

Be it known that I, CHARLES E. BONINE, of the city and county of Philadelphia and State of Pennsylvania, have invented certain new and useful Improvements in Manifolds, of which the following is a specification, reference being had to the accompanying drawings.

My invention relates to complementary or interfitting manifolds. Such manifolds are useful in connection with fluid circulatory systems, where there are a number of parallel pipes for accomplishing such circulation, and where it is desired that at one or both ends these pipes shall communicate alternately with different manifolds. Where this alternate communication of pipes with different manifolds is required, it is necessary, if an ordinary manifold is employed, to throw those pipes which communicate with one manifold into a different plane from those which communicate with the other, thus destroying their parallelism and causing the structure to occupy more space.

It is the object of my invention to construct manifolds which when used in pairs, the one complementary to the other, are capable of so interfitting that each manifold may be connected up with alternate pipes of a parallel series, all in a single plane. This I accomplish with a minimum number of joints or fittings, the entire manifold being a single unbroken casting, and only employing joints where each pipe is screwed into connection with the manifold, and also the necessary fitting for the connection of the manifold with its main supply or outlet pipe.

According to my invention the manifold is constructed in the shape of an elongated receptacle, with a series of offsets or projections, spaced to correspond with the spacing of the alternate pipes to which the manifold is to be connected.

I have shown in the drawings, and will describe my invention, as applied to a system of hot water conduction in which two manifolds, respectively connected with pipes for the intake and outflow of water, are interfitted so as to communicate alternately with the pipes of a parallel series, connecting at their other ends with a single header. In this way hot water received from the heating source by one manifold is caused to flow into every other pipe of the parallel series, and thence to the header at the farther end, from whence the cooler water is returned by the alternate pipes to the other manifold. Such an arrangement is useful where it is desired that the piping shall occupy as little space as possible, and that the hot and cooler water pipes shall be in close alternate relation to each other, in order to equally distribute the temperature, but it will be understood that my invention is not limited to any particular use to which the hot water circulation may be put, nor is it limited as to the nature of the circulating fluid, or whether it be hot or cold.

In the accompanying drawings, Figure I, shows in plan a hot water circulatory system, such as I have outlined. Fig. II, is an enlarged perspective view of the two manifolds, slightly separated from each other in order to the better show their construction. Fig. III, is a cross section through the same when the two manifolds are appropriately interfitted.

Referring to Fig. I, 1, is a pipe for the supply of hot water. 2, is a manifold embodying my invention, receiving hot water from supply pipe 1. The alternate pipes 3, 3, 3, of a parallel series are connected directly to the hot water manifold 2, at one end, and at the other to a header or manifold 4, of ordinary construction to which all of the pipes of the series are connected. The pipes 5, 5, 5, etc., alternating with the pipes 3, 3, 3, all connect with the manifold 6, which is complementary to and interfitted with the manifold 2. From the manifold 6, the partially cooled water is led away by pipe 7. The pipes of the series 3, 5, 3, 5, etc. are shown broken away to indicate their indefinite prolongation, and are provided with unions 8, 8. 9, is an air pipe for the header. It is to be understood that all of the pipes 3, 5, 3, 5, are parallel to each other, and that the series may be of any convenient number. The parts thus described need no further reference, except to more fully explain the construction of the manifolds 2, and 6, in which my invention resides.

Referring to Fig. II, it will be noticed that the manifold 2, is an elongated receptacle of generally rectangular outline. At one end it is connected with the supply pipe 1, in the ordinary way. It preferably diminishes in cross section toward the end farthest removed from the supply pipe 1. For this purpose, the back wall 10, of the manifold is at an angle to the opposite wall 11. Integral with the wall 11, there are cast a series of offsets or projections 12, 12. All of these offsets are similar to each other. They are preferably of rectangular outline, and they are spaced so as to accommodate in the spaces between them the corresponding offsets of the other manifold. The manifold 6, as shown in Fig. II, is the counterpart of the manifold 2, except that as illustrated, the connection of the pipes 3, 3, with the manifold 2, is made upon the side of each of the offsets, whereas the connection of the pipes 5, 5, with the manifold 6, is made at the ends of the offsets. This is because as shown in the figure the manifolds are arranged to lie in planes at right angles to each other, thus bringing the points where the pipes are fitted to them into the same plane (although it will be understood that as shown in the drawings, the manifolds are separated so as to separate these planes). But it is not necessary that there should be any difference between the manifolds. Both may be made alike with arrangements for the connection of the pipes upon the corresponding side of the offsets of each manifold. Under these circumstances the two manifolds are interfitted so that they each lie in the same plane.

With complementary interfitted manifolds constructed according to my invention, the pipes are connected directly with the manifolds at the appropriate place as by screwing the threaded end of the pipe into an appropriate boss formed upon the manifold as shown, without the interposition of any coupling or curved fitting.

I have spoken of the offsets of the manifolds as uniformly spaced to permit the interposition of the corresponding offsets of the other manifold. At some point of a series of parallel pipes, it may be desired to leave a wider space. If this is the case both of the complementary manifolds will at this point present a similarly widened space between either offsets as shown at 15, 15, of Fig. II. This in no wise destroys the complementary interfitting of the manifolds.

In various relations to each other, and subject to many variations in the details and shapes of the parts, my invention is characterized by the complementary construction of two manifolds, with spaced offsets capable of interfitting so that alternate members of a parallel series of pipes may be connected to one or other of the manifolds without departing from the plane in which the series lies.

Having thus described my invention, I claim:

In a fluid circulation system, a series of parallel pipes lying in a single plane; two interfitting complementary manifolds, each comprising an elongated receptacle with a series of similar offsets spaced to permit the interposition of offsets of one manifold between offsets of the other; said offsets being of sufficient depth to permit members of said series of pipes to be connected to one or other of the manifolds without departing from the plane in which the series lies.

In testimony whereof, I have hereunto signed my name at Philadelphia, Pennsylvania, this thirtieth day of September, 1910.

CHARLES E. BONINE.

Witnesses:
JAMES H. BELL,
E. L. FULLERTON.